United States Patent

[11] 3,615,189

[72] Inventors Masashi Hayakawa
 Tokyo;
 Kazunari Ueno, Tokyo; Yoshito Yasutake,
 Ube-shi, all of Japan
[21] Appl. No. 831,743
[22] Filed June 9, 1969
[45] Patented Oct. 26, 1971
[73] Assignee Central Glass Co., Ltd.
 Ube-shi, Japan
 Continuation of application Ser. No.
 622,452, Mar. 13, 1967, now abandoned.

[54] PROCESS FOR PREPARING GYPSUM HEMIHYDRATE
3 Claims, No Drawings
[52] U.S. Cl.................................................. 23/122,
 106/109
[51] Int. Cl......................................................... C01f 11/46
[50] Field of Search.......................................... 23/122,
 165; 106/109, 110

[56] References Cited
UNITED STATES PATENTS
| | | | |
|---|---|---|---|
| 2,002,547 | 5/1935 | Nordengren................ | 23/165 |
| 2,616,789 | 11/1952 | Hoggatt........................ | 23/122 |
| 3,416,887 | 12/1968 | Matsubara et al. ........... | 23/122 |

Primary Examiner—Oscar R. Vertiz
Assistant Examiner—Gregory A. Heller
Attorney—Woodhams, Blanchard and Flynn ABSTRACT: Stable calcium sulfate hemihydrate is produced by suspending particulate gypsum in a reaction mixture comprising a water solution of a water-soluble inorganic salt such as a salt of an alkali metal, an alkaline earth metal or ammonium, and at least one of the group consisting of phosphoric acid and water-soluble phosphate salts; and heating the reaction mixture at a temperature and for a period of time sufficient to convert the particulate gypsum to particulate calcium sulfate hemihydrate containing a small quantity of phosphoric acid in solid solution, and separating the particulate calcium sulfate hemihydrate from the reaction mixture.

PROCESS FOR PREPARING GYPSUM HEMIHYDRATE

CROSS-REFERENCE TO RELATED APPLICATION

This application is a continuation-in-part of our copending application Ser. No. 622,452, filed Mar. 13, 1967 and now abandoned.

BACKGROUND OF THE INVENTION

The present invention is an improvement in the known wet process for preparing calcium sulfate hemihydrate from gypsum (calcium sulfate dihydrate).

Calcium sulfate hemihydrate of the prior art, when once separated from the liquid reaction mixture in the wet process, exhibits the undesirable property of reacting with residual adhering moisture to reform solid calcium sulfate dihydrate in masses which cling to filter cloths, the inner walls, and to other parts of the separating apparatus. As a consequence, the prior finishing steps of filtering, separation, and washing of the calcium sulfate hemihydrate has required inconvenient, expensive, and restricted conditions of elevated temperatures of about 84° C. or higher to prevent premature hardening.

There has been some attempt to avoid these disadvantages through the use of setting retarders, but no acceptable method has heretofore been achieved.

SUMMARY OF INVENTION

We have discovered a process which permits the finishing steps of the wet process to be carried out at normal temperatures such as normal ambient or room temperatures.

We have discovered that the presence of phosphoric acid in minor amounts, in solid solution form, in calcium sulfate hemihydrate renders the calcium sulfate hemihydrate stable during the aforesaid finishing stages of the wet process even when carried out at normal ambient or room temperatures.

We have further discovered that in carrying out the wet process as it is known, but with the addition of the critical features hereinafter described, the product of the heat transformation of calcium sulfate dihydrate is calcium sulfate hemihydrate containing the necessary and critical small amount of phosphoric acid dissolved in solid solution.

Our process can be described as an improved novel variation of the known process wherein particulate (e.g., pulverized) calcium sulfate dihydrate is suspended in a heated salt solution and agitated for a period of time at elevated temperature. This treatment is known to cause transformation to the hemihydrate and our novel improvement includes the addition of phosphoric acid to the reaction mixture in sufficient quantity to cause incorporation of at least 0.01 percent of phosphoric acid, calculated as $P_2O_5$, in the particulate hemihydrate that is produced. This particulate product possesses the stability described above and permits the carrying out of filtration, separation and water-washing without setting up into clinging or adhering masses.

The phosphoric acid that is incorporated in accordance with our invention is present in the calcium sulfate hemihydrate in the form of a solute in the solid calcium sulfate hemihydrate, and the product is a solid solution. It is physically correct to regard this as a solid solution of phosphoric acid dissolved in calcium sulfate hemihydrate. We have found that such a solid solution possesses the desirable properties referred to above and at the same time possesses the desired hardening ability and has a superior whiteness when compared with calcium sulfate hemihydrate prepared by the known dry method. In addition, it possesses high consistency and wet tensile strength, and can be used as plaster and as a retarder for cement. It can also be used in the manufacture of building and wallboard.

The quantity of dissolved phosphoric acid, calculated as $P_2O_5$, can vary from 0.01 up to about 1 percent by weight, or higher, and the process of this invention can be carried out by those skilled in the art so as to produce such a final product, as for example, by adding a sufficient quantity of phosphoric acid to the aqueous suspension medium used in effecting the transformation of calcium sulfate dihydrate particles to calcium sulfate hemihydrate particles by the known wet process.

The novel process of this invention includes also the presence in solution in the conversion reaction mixture a water-soluble inorganic salt such as a salt of an alkali metal, of an alkaline earth metal, or of ammonium. The effect of the presence of the salt is to afford control of the vapor pressure of the conversion reaction mixture.

It is known that the vapor pressure of a solution in which, at a certain temperature, a salt is dissolved is in general lower than the vapor pressure of water held at the same temperature. By using such a solution having its vapor pressure thus reduced, or in other words, having an elevated boiling point, not only is it possible to obtain the conversion of calcium sulfate dihydrate to calcium sulfate hemihydrate, but also there occurs a shifting of the conversion temperature to the lower side, and further, as the concentration of the salt contained in the solution increases the conversion temperature will be made lower accordingly.

The present invention is based in part on the discovery that, in case calcium sulfate dihydrate is allowed to convert to calcium sulfate hemihydrate in an aqueous solution having a reduced vapor pressure and containing phosphoric acid therein, this phosphoric acid which is contained in said aqueous solution is enclosed, during the process of conversion in the form of a solid solution in the crystals of the produced calcium sulfate hemihydrate and also the discovery that the produced calcium sulfate hemihydrate will not easily revert to calcium sulfate dihydrate again.

The temperature at which the heating medium solution which is used in the aforesaid conversion reaction, as well as the type and the concentration of the water-soluble inorganic salts which are dissolved in this solution, can vary over a wide range. Thus, the temperature at which calcium sulfate dihydrate is converted to calcium sulfate hemihydrate can be set within a very wide range depending on the type and the concentration of the salts which are contained in the heating medium solution and also depending on the state of the crystals or the particles of calcium sulfate dihydrate. For example, chlorides such as those of magnesium, calcium and sodium and the corresponding nitrates are examples of suitable water-soluble inorganic salts which are useful in lowering the conversion temperature. The extent to which the conversion temperature is lowered varies with these individual salts as follows:

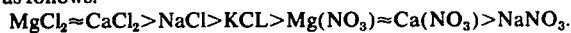

$MgCl_2 \approx CaCl_2 > NaCl > KCl > Mg(NO_3)_2 \approx Ca(NO_3)_2 > NaNO_3$.

The amount of salt should not exceed the concentration which the salt would deposit at the contemplated filtration temperature. Thus the concentration can range from about 3 to about 80 percent, and the range of 5 to 50 percent is preferred.

While the prior use of such salt solutions is known in the wet conversion process, the unique presence of phosphoric acid materials as in our invention, affords a reduction in conversion time of from 12–24 hours down to generally less than 5 hours. Of course the process of our invention also has the additional advantages described in this specification.

As will be seen, any inorganic water-soluble salt is operable, provided it does not interfere in the conversion reaction. The salt component can be a mixture of two or more salts or it can be a single salt. The cation of the salt can be an alkali metal, alkaline earth metal, ammonium or the like, while the anion can be a halide, sulfate, nitrate or the like. Suitable salts are alkali metal chlorides, alkali metal sulfates, alkali metal nitrates, alkaline earth metal chlorides, alkaline earth metal nitrates, ammonium chlorides, ammonium sulfates and ammonium nitrates.

DETAILED DESCRIPTION

The starting materials according to the present invention can range widely from the natural gypsums and synthetic gypsums. For example, naturally occurring gypsum, waste gypsum such as that recovered from scraps of plaster work and synthetic gypsum can be used.

As previously noted, the heating is at a temperature above the transition temperature whereby gypsum is converted in solid state to calcium sulfate hemihydrate. The quantity of phosphoric acid to be added will, of course, take into account the phosphoric acid, if any, already present in association with the gypsum.

The quantity of water-soluble inorganic salt present in the conversion solution is that sufficient to effect a substantial change in the vapor pressure of the reaction mixture.

The presence of the solute phosphoric acid in the product of our invention can be determined in known manner. For example, it can be determined in the following way.

The calcium sulfate hemihydrate produced in accordance with the present invention can contain phosphoric acid in three possible forms, as follows:

I. Phosphoric acid in the state of a solid solution in the particulate calcium sulfate hemihydrate.

II. Phosphoric acid contained in the calcium sulfate hemihydrate as a nonsoluble or undissolved phosphate.

III. Phosphoric acid mechanically adhering to the calcium sulfate hemihydrate.

The aggregate of I, II and III can be determined quantitatively by first dissolving a sample in a dilute acid solution and making a quantitative determination of phosphorus on the solution.

The amount of phosphoric present as I can be separately determined by washing a second sample with a saturated solution of calcium sulfate free of phosphoric acid, then dissolving the washed sample in water (the solubility being about 0.2 to 0.3 grams per 100 grams of water), filtering the solution and then analyzing the filtrate quantitatively for phosphorus.

The amount of phosphoric acid present as II can be determined by dissolving in dilute acid the solids separated by the filtration step of the A analysis, and analyzing the solution quantitatively for phosphorus.

The amount of phosphoric acid present as III can, of course, be determined by calculation from the above analyses.

We have determined by the following experiment the optimal range of phosphoric acid to be dissolved in the form of a solid solution in the calcium sulfate hemihydrate produced in accordance with the present invention.

EXPERIMENT

A. Preparation of pure calcium sulfate dihydrate:

Calcium chloride (140 grams per liter concentration) solution, and sodium sulfate (130 grams per liter concentration) solution were reacted in the ratio of molecular equivalence at a temperature range of 50°–60° C. The reaction product was separated by filtration and washed with water. The washed product was dried at 45°±5° C. to obtain pure calcium sulfate dihydrate. X-ray diffraction analysis of the crystalline product confirmed its structure as calcium sulfate dihydrate.

B. Preparation of calcium sulfate hemihydrate containing phosphoric acid in the state of solid solution:

Calcium sulfate dihydrate (200 grams) produced as in A above, were suspended in 1 liter of a heated solution containing 250 grams of calcium chloride dissolved therein and having a pH value of 1.2, controlled by addition of hydrochloric acid. To the solution was added sodium dihydrogen phosphate as the phosphate additive. While heating gently at 100° C. and stirring the reaction mixture, the calcium sulfate dihydrate was converted into calcium sulfate hemihydrate. The crystals thus produced were washed with water and then dried to constant weight at 45°±5°C.

By varying the quantity of added sodium dihydrogen phosphate from 0.2 gram to 1.5 grams, a series of individual lots of calcium sulfate hemihydrate having correspondingly varying amounts of phosphoric acid dissolved in the state of solid solution in the finally produced calcium sulfate hemihydrate.

The results are tabulated in table I. Included for each lot is the time required for the conversion to calcium sulfate dihydrate and the content of $P_2O_5$ present in the state of solid solution in the product.

TABLE I

| Lot No. | Amount of added $NaH_2PO_4$ (gr) | Total of $P_2O_5$ (%) by weight | Content of $P_2O_5$ which is dissolved in the state of solid solution in calcium sulfate hemihydrate (%) by weight | Time required for conversion into calcium sulfate dihydrate (in water of 23 °C.) |
|---|---|---|---|---|
| 1 | 0.2 | 0.006 | 0.005 | The majority portion transformed into calcium sulfate dihydrate in 20 minutes. |
| 2 | 0.5 | 0.011 | 0.010 | The majority portion transformed into calcium sulfate dihydrate in 30 minutes. |
| 3 | 1.0 | 0.032 | 0.030 | The majority portion transformed into calcium sulfate dihydrate in 40 minutes. |
| 4 | 1.5 | 0.056 | 0.050 | Started transition into calcium sulfate dihydrate at the end of 90 minutes. |

C. Determination of phosphoric acid contained in calcium sulfate hemihydrate.

a. Determination of total $P_2O_5$:

5 grams of calcium sulfate hemihydrate obtained in B, 25 ml. of concentrated hydrochloric acid (s.g. 1.18–1.19), and 250 ml. of water were added to a beaker having a capacity of 500 ml. The reaction mixture was heated for 20–30 minutes, during which time the calcium sulfate hemihydrate dissolved, the while stirring the mixture and supplying water so as to maintain a liquid volume of 250 ml. The mixture was then allowed to cool to room temperature and was transferred to a 500-ml. volumetric flask, and the volume accurately brought up to b500 ml. with water. A sample portion of the solution thus obtained was filtered through Toyo filter paper (5B), and 20 ml. of the filtrate transferred to a 100-ml. volumetric flask. 10-ml. nitric acid aqueous solution (1:4) and 20 ml. of developing liquid were added, and the mixture was stirred well and accurately diluted to 100 ml. with water. After 30 minutes, the absorbency at 420 m$\mu$ wavelength was determined by photoelectric spectrophotometry, against a blank test solution prepared in the dame manner as B above, but without the addition of the phosphoric acid. The content of $P_2O_5$ was obtained by using the formula given below against a standard calibration curve separately made as described below.

Total amount of $P_2O_5$(%)
$$= \frac{\text{Content of } P_2O_5(\text{mg.}) \times 500 \times 100}{\text{weight of sample (mg.)} \times \text{amount of pipetted sample solution (ml.)}}$$

The developing liquid was prepared by adding 27 grams of high-grade chemical reagent quality ammonium molybdate and 1.12 grams of high-grade chemical reagent quality ammonium metavanadate to about 800 ml. of warm water (below about 60° C.). After dissolution of the reagents, 150 ml. of high-grade chemical reagent quality concentrated nitric acid (s.g. 1.375) was added, followed by the addition of water to a total volume of 1 liter.

The preparation of the standard phosphoric acid solution and the making of the standard calibration curve is as follows:

High-grade chemical reagent quality potassium dihydrogen phosphate (19.175 grams, weighed after drying in a desiccator for more than 24 hours), was dissolved in water and the solution accurately diluted with water to 1 liter. This solution thus contains 10 mg. of $P_2O_5$ per ml., and can be used as a standard.

Portions of the standard solution, diluted properly to make up a series containing from 0.001 to 1.0 mg. of $P_2O_5$, were transferred to 100-ml. volumetric flasks, and water was added to each of them so as to make up a liquid volume of about 50 ml., whereupon 20 ml. of the developing liquid was added and the total mixture diluted accurately to 100 ml. After 30 minutes, the absorbency at 420 $\mu$ wavelength was determined against a blank aqueous solution prepared in the same way as described above except that the standard phosphoric acid solution was omitted. A diagram was then made indicating the relation between absorbency and concentration of $P_2O_5$.

b. Determination of phosphoric acid dissolved in calcium sulfate hemihydrate in the state of solid solution (I):

About 5 grams of calcium sulfate hemihydrate obtained, for example, as in B was transferred to a 500-ml. beaker where it was washed thoroughly at 20° C. to remove phosphoric acid adhering to the surface of the particles. A pure water solution saturated with calcium sulfate hemihydrate was used as the washing agent. The washed calcium sulfate hemihydrate was vacuum filtered and dried at 45°±5° C. to constant weight. One-half gram of the dried sample was transferred to a 500-ml. volumetric flask, 250 ml. of water added and the flask shaken for 30 minutes on a rotary shaking machine moving at 30–40 rotations per minute. It was then filtered through a filter paper and thoroughly washed with water. The $P_2O_5$ content contained in the form of II was determined by the method of C above. The filtrate was treated with 10 ml. of nitric acid (1:4) and evaporated to a volume of 30 ml., and then transferred to a 100-ml. volumetric flask. The solution was cooled to room temperature, mixed with 20 ml. of developing liquid and the mixture diluted accurately to 100 ml. and then shaken thoroughly. After 30 minutes the absorbency at 420 $\mu$ wavelength was determined against the blank test solution. The $P_2O_5$ content was determined by the standard calibration curve as follows:

$$P_2O_5(\%) = \frac{\text{Content of } P_2O_5(\text{mg.}) \times 100}{\text{Sample weight (mg.)}}$$

c. Determination of phosphoric acid contained in the form of nonsoluble phosphate (II):

The residue obtained in the determination of $P_2O_5$ mentioned in b was dissolved in concentrated hydrochloric acid. The resulting solution was filtered through a filter paper and then thoroughly washed with water. The filtrate was transferred into a 100-ml. volumetric flask, mixed with 10 ml. of nitric acid (1:4) and 20 ml. developing liquid. Water was added to an accurate volume of 100 ml. and the mixture shaken thoroughly.

After 30 minutes, the absorbency of 420 $\mu$ wavelength was determined against the blank test solution. Then the content of $P_2O_5$ was obtained by using standard calibration curve.

DESCRIPTION OF THE PREFERRED EMBODIMENTS

EXAMPLE 1

200 grams of chemical gypsum free of phosphoric acid was suspended in 1 liter of solution (temperature being 100° C., with a pH of 1.1) containing 0.45 gram of phosphoric acid (as $P_2O_5$) and 250 grams of calcium chloride. The mixture was stirred gently in a vessel. The transition into calcium sulfate hemihydrate was completed at the end of 45 minutes. The resulting suspension was subjected to vacuum filtering. The calcium sulfate hemihydrate obtained after washing the separated calcium sulfate hemihydrate with water of normal temperature (15° C.) and after drying it at a temperature of about 60° C. showed the following properties.

| | |
|---|---|
| Total moisture: | 6.32% |
| Total phosphoric acid: | 0.16% (as $P_2O_5$) |
| Phosphoric acid dissolved, in the state of solid solution: | 0.10% (as $P_2O_5$) |

Time required for transition into calcium sulfate dihydrate (in water of 15° C.):

Calcium sulfate hemihydrate of this example:
  Did not transfer into calcium sulfate dihydrate even at the end of 1.5 hours.
Control calcium sulfate hemihydrate obtained from solution not containing phosphoric acid:
  Completely transferred into calcium sulfate dihydrate at the end of 30 minutes.

A test according to JIS R-9112 (1959) conducted on pulverized calcium sulfate hemihydrate of this example showed the following result:

EXAMPLE 2

| | Normal consistency | Wet tensile strength |
|---|---|---|
| Product of this example | 38.5% | 28.0 kg./cm.² |
| Product from same material by dry process (pulverized after being calcined at 180° C.) | 63.0% | 11.6 kg./cm.² |

EXAMPLE 2

300 grams of gypsum (total $P_2O_5$ being 0.85 percent) which was a byproduct from the process of preparing phosphoric acid by treating phosphate rock with sulfuric acid was suspended in 1 liter of solution containing 78 g./liter of sodium sulfate and 50 g./liter of sodium chloride (the temperature of this solution being 98° C., with a pH of 1.94). While gently stirring the suspension in a vessel, the transition into calcium sulfate hemihydrate was completed at the end of 110 minutes. The resulting suspension was subjected to vacuum filtering. The calcium sulfate hemihydrate obtained after washing the separated calcium sulfate hemihydrate with water of normal temperature (18° C.) and after drying it at a temperature of about 80° C. had the following properties.

| | |
|---|---|
| Total moisture | 6.28% |
| Total phosphoric acid | 0.40% (as $P_2O_5$) |
| Phosphoric acid dissolved in the state of solid solution | 0.25% (as $P_2O_5$) |

Time required for transition into calcium sulfate dihydrate (in water of 18° C.):

Calcium sulfate hemihydrate of this example:
  Did not transfer into calcium sulfate dihydrate even at the end of 3.5 hours.

A test according to JIS R-0112 (1959) (1959) conducted on pulverized calcium sulfate hemihydrate of this example showed the following result:

| | Normal consistency | Wet tensile strength |
|---|---|---|
| Product of this example | 42.0% | 26.5 kg./cm.² |
| Product from same material by dry process (pulverized after being calcined at 180° C.) | 67.3% | 8.5 kg./cm.² |

EXAMPLE 3

One kg. of natural gypsum pulverized to minus 150 mesh (by Tyler standard sieve) was suspended in 3 liters of solution (having a temperature of 98° C., with a pH ranging from 5.0 to 5.5) containing 220 g./liter of sodium chloride and 0.4 g./liter of sodium dihydrogen phosphate (as $P_2O_5$). While gently stirring the suspension in a vessel, the transition into calcium sulfate hemihydrate was completed at the end of 3.5 hours. The resulting suspension was subjected to vacuum filtering. The calcium sulfate hemihydrate obtained after washing the separated calcium sulfate hemihydrate with water of normal temperature (22° C.) and after drying it at a temperature of about 65° C. showed the following properties.

| | |
|---|---|
| Total moisture | 6.28% |
| Total phosphoric acid | 0.10% (as $P_2O_5$) |
| Phosphoric acid dissolved in the state of solid solution | 0.08% (as $P_2O_5$) |

Time required for transition into calcium sulfate dihydrate (in water of 22° C.):

Calcium sulfate hemihydrate of this example:
  Did not transfer into calcium sulfate dihydrate even at the end of 1.5 hours.

Control calcium sulfate hemihydrate obtained from a solution in which sodium dihydrogen phosphate was not dissolved:
  Completely transferred into calcium sulfate dihydrate in 30 minutes.

A test according to JIS R-9112 (1959) conducted on pulverized calcium sulfate hemihydrate of this example showed the following result:

| | Normal consistency | Wet tensile strength |
|---|---|---|
| Product of this example | 38.6% | 27.4 kg./cm.² |
| Product from same material by dry process (pulverized after being calcined at 180° C.) | 66.8% | 10.6 kg./cm.² |

EXAMPLE 4

300 grams of waste gypsum pulverized to minus 100 mesh (with Tyler standard sieve) and not having phosphoric acid was suspended in 1 liter of solution containing 0.45 gram of sodium dihydrogen phosphate (as $P_2O_5$) and 250 grams of ammonium sulfate (said solution having a temperature of 95° C. and a pH of 3.5). While gently stirring the suspension in a vessel, the transition into calcium sulfate hemihydrate was completed at the end of 120 minutes. The resulting suspension was subjected to vacuum filtering. The calcium sulfate hemihydrate obtained after washing the separated calcium sulfate hemihydrate with water of normal temperature (20° C.) and after drying it at about 60 C. showed the following properties.

| | |
|---|---|
| Total mositure | 6.30% |
| Total phosphoric acid | 0.06% (as $P_2O_5$) |
| Phosphoric acid dissolved in the state of solid solution | 0.02% (as $P_2O_5$) |

Time required for transition into calcium sulfate dihydrate (in water of 20° C.):

Calcium sulfate hemihydrate of this example:
  Started transition into calcium sulfate dihydrate at the end of 1.5 hours.

Control calcium sulfate hemihydrate obtained from a solution in which sodium dihydrogen phosphate was not dissolved:
  Completely transferred into calcium sulfate dihydrate in 30 minutes.

A test according to JIS R-9112 (1959) conducted on pulverized calcium sulfate hemihydrate of this example showed the following result:

| | Normal consistency | Wet tensile strength |
|---|---|---|
| Product of this example | 42.1% | 23.5 kg./cm.² |
| Product from same material by dry process (pulverized after being calcined at 180° C.) | 65.6% | 14.5 kg./cm.² |

EXAMPLE 5

Continuous transition of phosphoric acid calcium sulfate dihydrate obtained from the wet method into calcium sulfate hemihydrate was performed at the rate of 4 liters per hour while stirring a suspension having the proportion of 330 grams of said phosphoric acid calcium sulfate dihydrate (total $P_2O_5$ being 0.98 percent) to one liter of calcium chloride (250 g./l. in two 3-liters vessels connected in series with a stirrer and a heater. The suspension from the first vessel (the temperature of this vessel being in the range of from 90° C. to 95° C., with a pH of 0.95) was led to the second vessel (the temperature of this vessel being in the range of from 80° C. to 85° C., with a pH of 1.1). The suspension discharged from the second vessel was subjected to vacuum filtering. The filtered mother liquid was recycled to said first vessel. The produced calcium sulfate hemihydrate which was washed with water of normal temperature (20° C.) and then dried at about 60° C., had the following properties.

| | |
|---|---|
| Total moisture | 6.35% |
| Total phosphoric acid | 0.35% (as $P_2O_5$) |
| Phosphoric acid dissolved in the state of solid stolution | 0.21% (as $P_2O_5$) |

Time required for transition into calcium sulfate dihydrate (in water of 20° C.):

Calcium sulfate hemihydrate of this example:
  Did not transfer into cal- cium sulfate dihydrate even at the end of 3.0 hours.

A test according to JIS B-9112 (1959) (1959) conducted on pulverized calcium sulfate hemihydrate of this example showed the following result:

| | Normal consistency | Wet tensile strength |
|---|---|---|
| Product of this example | 39.5% | 27.5 kg./cm.² |
| Product from same material by dry process pulverized after being calcined at 180° C.) | 62.5% | 9.9 kg./cm.² |

The embodiments of the invention in which an exclusive property or privilege is claimed are defined as follows:

1. A method for producing stable calcium sulfate hemihydrate which comprises suspending particulate gypsum in a reaction mixture comprising a 3 percent to 80 percent aqueous solution of a water-soluble inorganic salt selected from the group consisting of the water-soluble salts of alkali metals, alkaline earth metals and ammonium which will not react with said gypsum and at least one of the group consisting of phosphoric acid and a water-soluble phosphate salt, heating the reaction mixture at a temperature above the transition temperature whereby gypsum is converted in the solid state to calcium sulfate hemihydrate and for a period of time sufficient to convert the particulate gypsum to particulate calcium sulfate hemihydrate containing 0.01 to 1.0 percent of phosphoric acid calculated as $P_2O_5$ in the state of solid solution, and separating said particulate calcium sulfate hemihydrate from the reaction mixture 2. A process for preparing calcium sulfate hemihydrate according to claim 1, in which said aqueous solution has a pH not exceeding seven.

3. A process for preparing calcium sulfate hemihydrate according to claim 1, in which said aqueous solution, after separation of said calcium sulfate hemihydrate therefrom, is recycled to the beginning of the process.

* * * * *